June 20, 1961
JULIETTE DELPHINE CELESTINE HENRY
BORN DESRUES
SAFETY HOISTING HOOK
2,989,336
Filed July 7, 1960
2 Sheets-Sheet 1
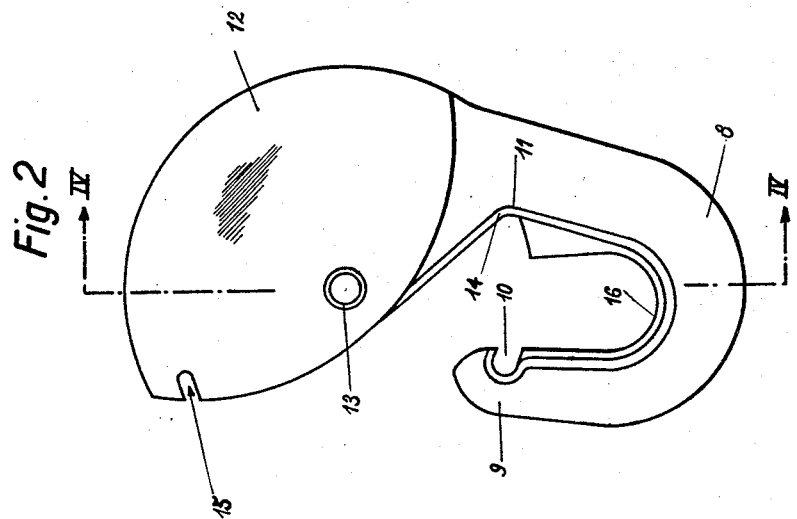
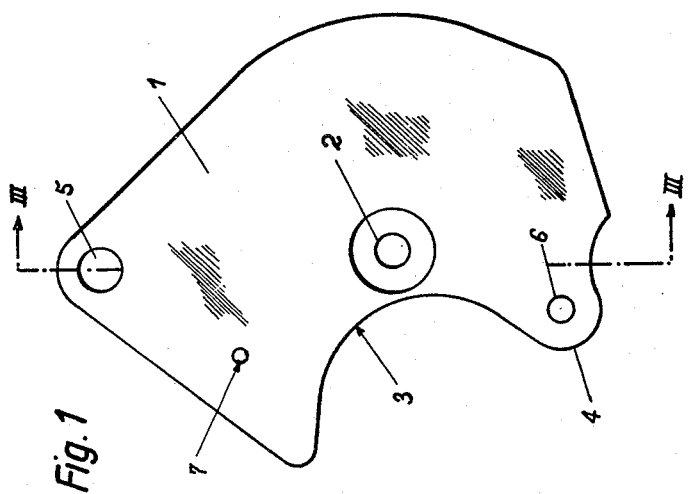

June 20, 1961
JULIETTE DELPHINE CELESTINE HENRY
BORN DESRUES
SAFETY HOISTING HOOK
Filed July 7, 1960
2,989,336
2 Sheets-Sheet 2
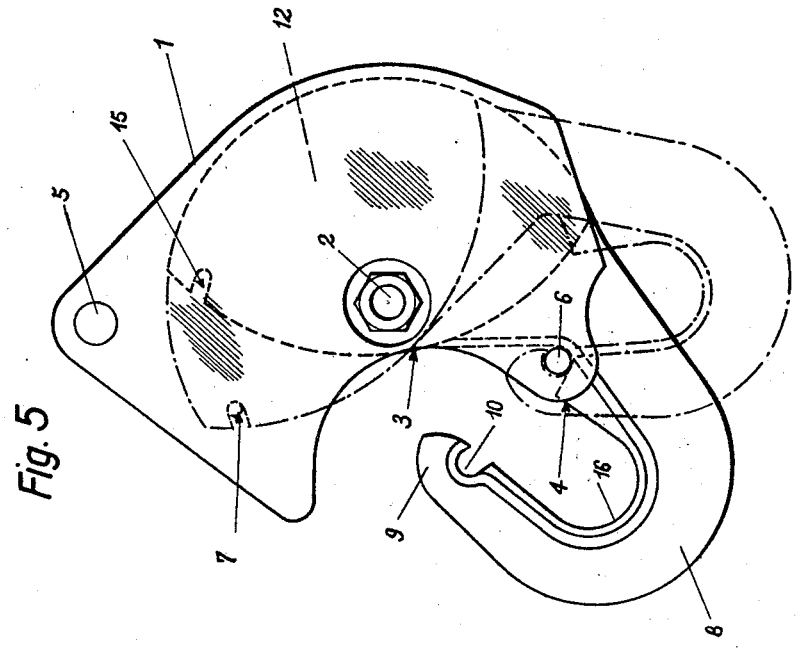
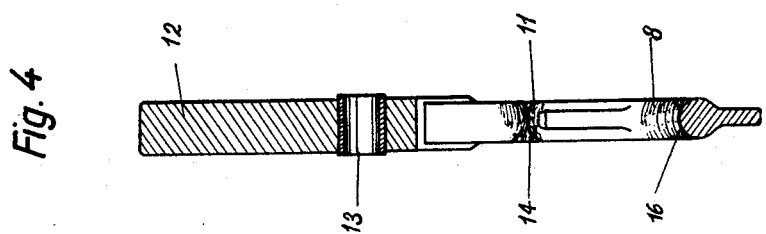
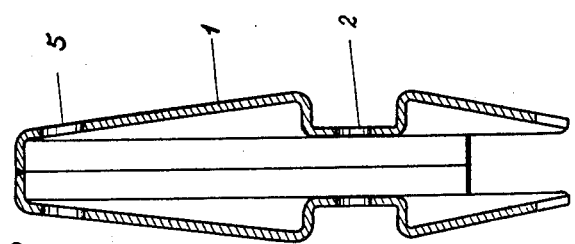

United States Patent Office 2,989,336
Patented June 20, 1961

2,989,336
SAFETY HOISTING HOOK
Juliette Delphine Celestine Henry, born Desrues,
50 Rue de la Pie aux Anglais, Rouen, France
Filed July 7, 1960, Ser. No. 41,288
Claims priority, application France Sept. 1, 1959
5 Claims. (Cl. 294—83)

My invention has for its object a hoisting hook, the rocking of which round a horizontal axis provides a closure of perfect reliability; said hook, when it carries no load, opens automatically and, when it does carry a load, it closes automatically without any manual operation being required for this safety closing.

The automatic control of the closing of the hook is obtained through the counteracting action of the useful load carried by the hook and of a counterweight provided at one end of the actual hook.

My invention is chiefly characterized by the fact that the hook terminates at one end with a nose provided with an inwardly facing recess and at its other end with a support rigid with the counterweight and pivotally secured to a shaft, while said counterweight and support are housed inside a hollow strap which is carried in its turn at its upper end by a stationary member. Said strap carries transversely near its center the counterweight shaft and, futhermore, two safety shafts, one of which is located below said pivotal shaft in a tail-piece of the strap and is adapted to engage the recess in the hook nose, while the other safety shaft extends above the pivotal shaft and is adapted to engage a recess provided in the upper end of the counterweight.

The lower safety shaft underneath the pivotal shaft serves as an abutment, either for the lower end of the hook opposed to the nose during the rocking of said hook into its open position, or for the nose of the hook when said hook rocks into its closing position, the lower safety shaft then engaging automatically into the recess in the hook nose.

When the safety shaft above the pivotal connection of the counterweight has engaged the recess in said counterweight during the loading operation, the bearing thus obtained has for its object to provide a small gap between the hook nose and the lower safety shaft, so that said nose may engage its safety shaft solely in the case of an overload, so as to add its mechanical resistance to that of the hook which operates then after the manner of a ring with a considerable increase of its resistance against breaking.

An important feature of the arrangement resides in the fact that when the hook is operative under load, the shafts thus stressed operate in practically superposed positions and, when operating under overload, the two safety shafts operate together, so that their actions are added together.

The mass forming the counterweight may be replaced by a return spring housed inside the strap and secured, on the one hand, to the upper end of said strap and, on the other hand, to the end of the hook which is opposed to the nose end, said spring having a tendency to make the hook rock into its open position.

It is also possible to produce double hooks or to modify the shape of the different parts, or even, to reverse the closing system in a manner such that the locking is performed through the outer surface of the hook nose.

I have illustrated in the accompanying drawings a preferred embodiment of my invention. In said drawings:

FIG. 1 is an elevational side view of the strap.

FIG. 2 is an elevational side view of the hook to be housed inside the strap.

FIG. 3 is a vertical cross-section of said strap or housing.

FIG. 4 is a section of hook-element 8 taken along the section line IV—IV of FIG. 2 and in the direction designated by the arrow points.

FIG. 5 is an elevational side view of the hook carried inside the strap or housing.

The strap 1 is constituted by a hollow housing closed along three sides and constituted, for instance, by stamped metal sheets; said housing assuming, in elevational view, the shape illustrated in FIG. 1 is secured near its center to a shaft 2 extending throughout said strap which is provided with a recessed section 3 and a tail-piece 4 underneath the latter. The housing or strap 1 may be suspended, for instance, through an opening 5 formed in the upper end, to any suitable support. Said strap carries two safety shafts 6 and 7 located respectively in the tail-piece underneath the carrier shaft 2 and above said shaft 2.

The actual substantially U-shaped hook 8 terminates at one end with a nose 9 provided with an inner recess 10 and at its other end with a body 11 rigid with a counterweight 12 and projecting above the nose 9 with a spacing therebetween.

The breadth of the housing 1 is such that it may carry inside it with a clearance the counterweight 12 which is provided with a bore 13 fitted over the shaft 2, so as to allow a rocking of the hook round the latter.

The body 11 of the hook which is opposed to the nose 9 has an inner recessed section 14 adapted to engage the safety shaft 6. Similarly, the inner diameter of the recess 10 formed in the nose 9 is such that said safety shaft 6 may engage said recess 10.

The counterweight 12 is provided at its upper end with a recess 15, the breadth of which is such that it may be engaged by the upper safety shaft 7.

When the strap is suspended in the manner illustrated in FIG. 5, so as to carry the hook 8 without any load thereon, the counterweight 12 pivotally secured to the shaft 12 rocks forwardly clockwise, as shown in FIG. 2, round the shaft 2, under the action of its weight, so as to bring the hook into its inoperative position drawn in solid lines in FIG. 5, said rocking movement being stopped by engagement of the recessed section 14 of the hook with the safety shaft 6.

In contradistinction, when a load is applied to the bottom of the hook at 16, said load overcomes the action of the counterweight which rocks then around the shaft 2 in a direction opposed to the precedingly described movement, until the counterweight engages, through its recess 15, the upper abutment or safety shaft 7. The hook occupies then the position illustrated in dot-and-dash lines in FIG. 5 and the closing of the hook is ensured with perfect reliability. In the case of an overload, the lower end of the hook which has a reduced cross-sectional area at 11 is deformed and the nose 9 engages through its recess 10 the lower abutment or safety shaft 6.

In order that the hook may open again, it is necessary for its load to be laid, for instance on the ground or another bearing surface, whereby the counterweight 12 is again operative and rocks round the shaft 2, which opens again the hook as a consequence of the release of the nose 9 with reference to the safety shaft 6 and of the counterweight 12 with reference to the shaft 7.

The counterweight may be replaced by a return spring secured, on the one hand, to the upper section of the strap and, on the other hand, to the body of the hook at 11, said return spring housed inside the strap 1 operating in the same manner as the counterweight 12.

What I claim is:

1. A hoisting arrangement comprising a lower U- shaped hook section terminating at one end with a nose provided with a recess on its surface facing the inside of said lower section and an upper hook section rigid with the other end of the U-shaped section and provided with a recess at the upper end of its surface facing the first-mentioned end of the lower section, a housing for said sections adapted to be secured through its upper end to a stationary point, a pivotal shaft for the upper section of the hook extending across the housing, two abutments carried inside the housing respectively above and below the pivotal shaft, the upper abutment engaging the recess in the upper hook section to hold the latter when urged by the load on the lower section into its foremost operative position and the lower abutment engaging the recess in the nose for said operative position of the hook sections, and means urging the upper section of the hook into its rearmost inoperative position engaging the upper abutment.

2. A hoisting arrangement comprising a lower U-shaped hook section terminating at one end with a nose provided with a recess on its surface facing the inside of said lower section and an upper hook section rigid with the other end of the U-shaped section and provided with a recess at the upper end of its surface facing the first-mentioned end of the lower section, a housing for said sections adapted to be secured through its upper end to a stationary point, a pivotal shaft for the upper section of the hook extending across the housing, two abutments carried inside the housing respectively above and below the pivotal shaft, the upper abutment engaging the recess in the upper hook section to hold the latter when urged by the load on the lower section into its foremost operative position and the lower abutment engaging the recess in the nose for said operative position of the hook sections, and a counterweight rigid with the upper section of the hook and urging the upper section of the hook into its rearmost inoperative position engaging the upper abutment.

3. A hoisting arrangement comprising a lower U-shaped hook section terminating at one end with a nose provided with a recess on its surface facing the inside of said lower section and an upper hook section rigid with the other end of the U-shaped section and provided with a recess at the upper end of its surface facing the first-mentioned end of the lower section, a housing for said sections adapted to be secured through its upper end to a stationary point, a pivotal shaft for the upper section of the hook extending across the housing, two abutments carried inside the housing respectively above and below the pivotal shaft, the upper abutment engaging the recess in the upper hook section to hold the latter when urged by the load on the lower section into its foremost operative position and the lower abutment engaging the recess in the nose for said operative position of the hook sections, and a spring connecting the upper section of the hook with the housing and urging the upper section of the hook into its rearmost inoperative position engaging the upper abutment.

4. A hoisting arrangement comprising a lower U-shaped hook section terminating at one end with a nose provided with a recess on its surface facing the inside of said lower section and an upper hook section rigid with the other end of the U-shaped section and provided with a recess at the upper end of its surface facing the first-mentioned end of the lower section, a housing for said sections adapted to be secured through its upper end to a stationary point, a pivotal shaft for the upper section of the hook extending across the housing, two abutments carried inside the housing respectively above and below the pivotal shaft, the upper abutment engaging the recess in the upper hook section to hold the latter when urged by the load on the lower section into its foremost operative position and the lower abutment engaging the recess in the nose for said operative position of the hook section and the inner surface of the lower section of the hook opposed to the nose for the foremost operative position of the hook, and means urging the upper section of the hook into its rearmost inoperative position engaging the upper abutment.

5. A hoisting arrangement comprising a lower U-shaped hook section terminating at one end with a nose provided with a recess on its surface facing the inside of said lower section and an upper hook section rigid with the other end of the U-shaped section and provided with a recess at the upper end of its surface facing the first-mentioned end of the lower section, a housing for said sections adapted to be secured through its upper end to a stationary point, a pivotal shaft for the upper section of the hook extending across the housing, two abutments carried inside the housing respectively above and below the pivotal shaft, the upper abutment engaging the recess in the upper hook section to hold the latter when urged by the load on the lower section into its foremost operative position and the lower abutment engaging the inner surface of the lower section of the hook opposed to the nose for the foremost operative position of the hook, and means urging the upper section of the hook into its rearmost inoperative position engaging the upper abutment.

No references cited.